(12) United States Patent
Swatek et al.

(10) Patent No.: US 7,611,338 B2
(45) Date of Patent: Nov. 3, 2009

(54) TANDEM ESP MOTOR INTERCONNECT VENT

(75) Inventors: Mike Allen Swatek, Claremore, OK (US); Van J. McVicker, Collinsville, OK (US)

(73) Assignee: Baker Hughes Incorporated, Houston, TX (US)

( * ) Notice: Subject to any disclaimer, the term of this patent is extended or adjusted under 35 U.S.C. 154(b) by 406 days.

(21) Appl. No.: 11/387,184

(22) Filed: Mar. 23, 2006

(65) Prior Publication Data

US 2007/0224057 A1    Sep. 27, 2007

(51) Int. Cl.
*F04B 35/04* (2006.01)
*H02K 5/16* (2006.01)

(52) U.S. Cl. ............... 417/414; 417/424.1; 310/59; 310/90

(58) Field of Classification Search ........... 417/417, 417/424.1; 310/58, 59, 112
See application file for complete search history.

(56) References Cited

U.S. PATENT DOCUMENTS

| 2,569,741 | A | * | 10/1951 | Arutunoff ............ 310/87 |
| 3,384,769 | A | | 5/1968 | Schaefer et al. |
| 4,350,911 | A | * | 9/1982 | Wilson et al. .......... 310/87 |
| 4,409,504 | A | | 10/1983 | Wilson et al. |
| 4,578,608 | A | | 3/1986 | Mech et al. |
| 4,992,689 | A | | 2/1991 | Bookout |
| 5,221,214 | A | | 6/1993 | Martin |
| 6,780,037 | B1 | | 8/2004 | Parmeter et al. |

* cited by examiner

*Primary Examiner*—Devon C Kramer
*Assistant Examiner*—Christopher Bobish
(74) *Attorney, Agent, or Firm*—Bracewell & Giuliani LLP

(57) ABSTRACT

An electrical submersible well pump assembly has upper and lower motors that are filled with oil. During installation in a well, the upper motor lowers into engagement with the lower motor. The drive shafts of the motors have splined ends that engage each other within a central cavity. A vent port leads from the central cavity to the exterior for venting any trapped air located within the central cavity.

10 Claims, 3 Drawing Sheets

TANDEM ESP MOTOR INTERCONNECT VENT

FIELD OF THE INVENTION

This invention relates in general to electrical submersible well pumps and in particular to a vent port at the interconnect between upper and lower subs for venting trapped air.

BACKGROUND OF THE INVENTION

Electrical submersible pumps ("ESP") of the type concerned herein are used for pumping high volumes of well fluid. The pump of this type has at least one electrical motor that normally is a three-phase, AC motor. The motor drives a centrifugal pump containing a large number of stages, each stage comprising an impeller and a diffuser. The motor is filled with a dielectric lubricant or oil. A seal section connects between the pump and the motor for equalizing the pressure of the lubricant contained within the motor with the hydrostatic pressure on the exterior. The seal section is filled with oil that communicates with the oil in the motor. Two or more electrical motors may be connected in tandem to drive large pumps. The connecting adapter between the motors preferably has communication passages so that the oil in each motor communicates with oil in the other motor or motors.

Techniques are employed to reduce any air pockets that may be trapped within the motor or seal seation, because air within the oil is detrimental. For convenience, the motor and seal section are referred to at times herein as subs of an ESP assembly. Normally the subs are filled with oil at a manufacturer's facility, then caps are secured to the ends to retain the oil. During filling, the sub is inclined and a vacuum hose connected to a port at the head of the sub. An oil injection hose is connected to a fill port on the base of the sub. After evacuation, the operator pumps oil into the sub, then secures sealing caps to the ends.

When at the wellsite, normally a workover rig with a derrick will be present for running the ESP on the lower end of a string of production tubing. The operator picks up the motor and suspends it vertically over the wellbore. The operator removes the cap from the seal section and lowers it onto the head of the motor. During this process some oil will usually leak out from the seal section. The drive shaft in the seal section has a lower splined end that is located within a cavity in the base of the seal section. The upper end of the cavity is closed by a shaft bushing which restricts oil from flowing down the central cavity. Once the shipping cap is removed, the lower end is open because it must receive the upper end of the drive shaft of the motor. This downward facing cavity traps air when the motor and seal section are connected together.

After the connection is made up, the operator tops up the oil in the seal section by pumping oil up through an upper port in the motor. Air, including the trapped air in the cavity, is vented through a port at the top of the lower chamber of the seal section.

Removing trapped air is more difficult for the interconnection between tandem motors because the components within the upper motor tend to restrict upward air migration during operation. The interconnection between tandem motors is quite similar to the interconnection between the motor and the seal section. Some upper tandem motors may have a check valve to restrict downward flow of oil after the shipping cap is removed and before make-up, however, the trapped air pocket will still exist.

In some instances, the operator may connect a vacuum pump to an upper port in the upper tandem motor when topping up the oil after make up of the upper tandem motor to the lower tandem motor. While this wellsite vacuum filling procedure may reduce or eliminate trapped air pockets at the interconnection, it takes more time to use the vacuum to top up oil than simply pumping oil in a lower port and venting at an upper port. The additional time is costly because of the cost of the workover rig. Also, vacuum filling of tandem motors at the wellsite is difficult to accomplish in cold climates.

SUMMARY OF THE INVENTION

In this invention, a vent port is provided from the central cavity in the base of the upper sub to the exterior. The operator may use conventional techniques for initially filling the subs with oil. Preferably, the subs are filled by vacuum filling at the manufacturer's facility, then capped. At the wellsite, the operator suspends the upper sub above the lower sub, opens the vent port and removes the caps. At least some of any oil in the central cavity surrounding the drive shaft of the upper sub will drain out as the upper sub is lowered onto the lower sub, resulting in the entry of air into the central cavity.

The air within the central cavity is displaced out the vent port once the subs engage each other. The oil in the upper sub flows up into the central cavity, pushing the oil out the vent port. When oil begins the flow out the vent port, the operator closes the vent port. The operator then tops up the oil in the upper sub by pumping oil into an upper port of the lower sub until oil begins to flow out the upper port of the upper sub.

DETAILED DESCRIPTION OF THE INVENTION

Figure 2C:
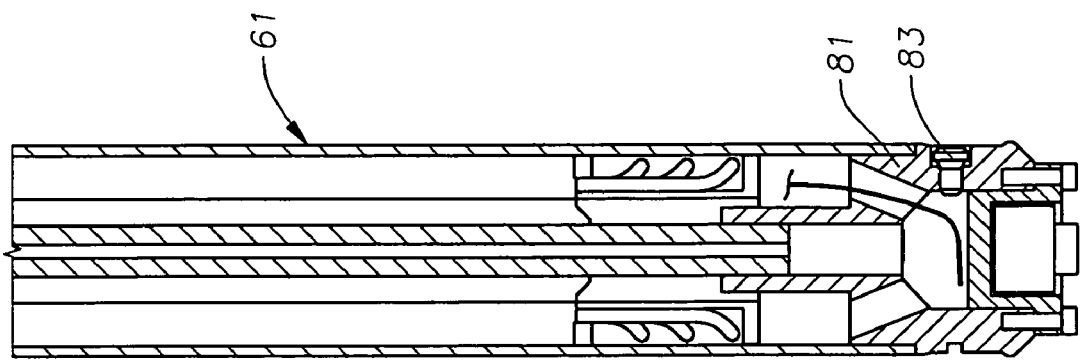
FIGS. 2A-2C comprise upper, intermediate and lower sectional views of portions of the tandem motor illustrated in FIG. 1.
Figure 2B:
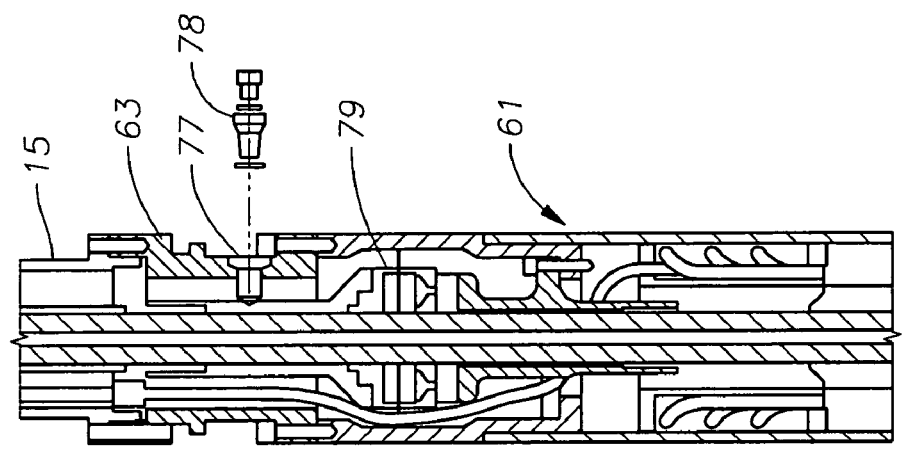
Figure 2A:
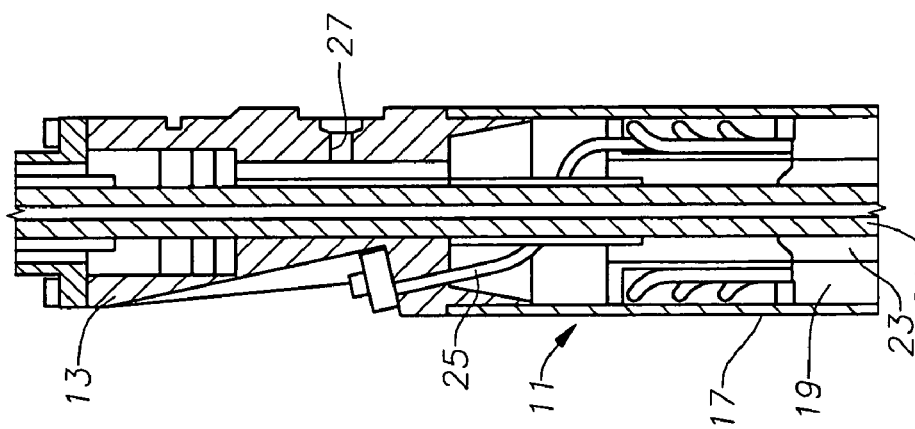

Referring to FIGS. 2A and 2B, an upper motor 11 with a head 13 and a base 15 is shown. Head 13 and base 15 are secured to opposite ends of a cylindrical tubular housing 17. A stator or motor winding 19 is located within the housing 17. An upper drive shaft 21 extends through stator 19, drive shaft 21 being driven by a rotor 23 located within stator 19. In this embodiment, upper motor 11 is a three-phase motor, and three electrical conductors 25 (only one shown) extend from head 13 to stator 19. Housing 17 is filled with dielectric lubricant or oil and preferably has an upper port 27 located within head 13. Head 13 secures to a seal section (not shown), which is a sub filled with oil and which has means for equalizing the pressure of the oil in upper motor 11 with the hydrostatic pressure on the exterior.

Figure 1:
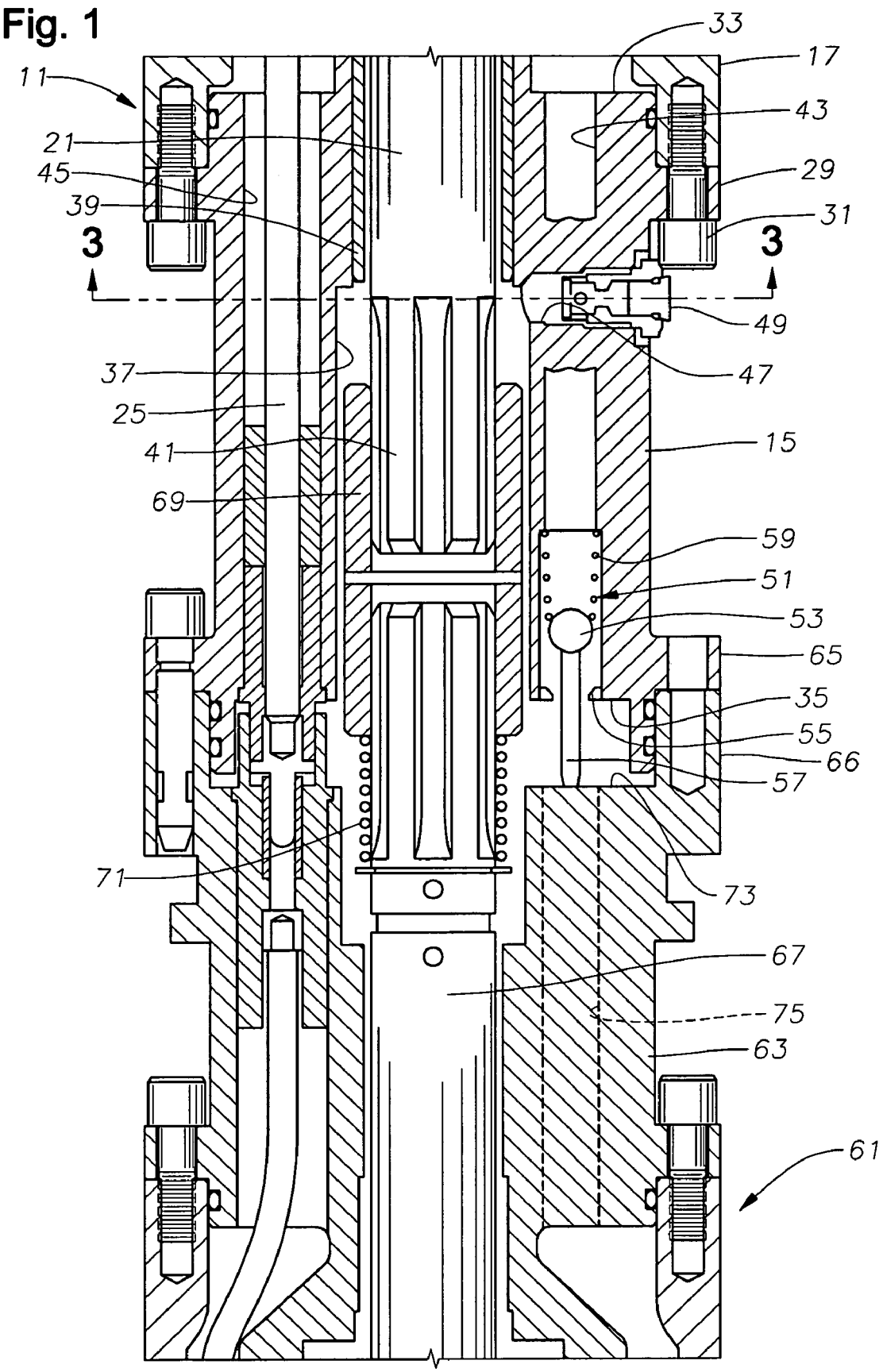
FIG. 1 is a vertical sectional view illustrating an interconnecting portion in accordance with this invention between two tandem motors of an the electrical submersible pump assembly.

Base 15 of upper motor 11 is illustrated in more detail in FIG. 1. Base 15 has an upper annular flange 29 that is secured by fasteners 31 to housing 17. Base 15 has an upper shoulder 33 that extends into housing 17 of stator 19 (FIG. 1). Base 15 has an a lower face 35 and a central cavity 37 that extends upward from lower face 35. Central cavity 37 is a cylindrical counterbore within base 15 with an open lower end at lower face 35. A bushing 39 radially supporting upper drive shaft 21 defines the upper end of central cavity 37. Upper drive shaft 21 has a lower end 41 that contains a plurality of splines. Splined lower end 41 is located within central cavity 37.

Figure 3:
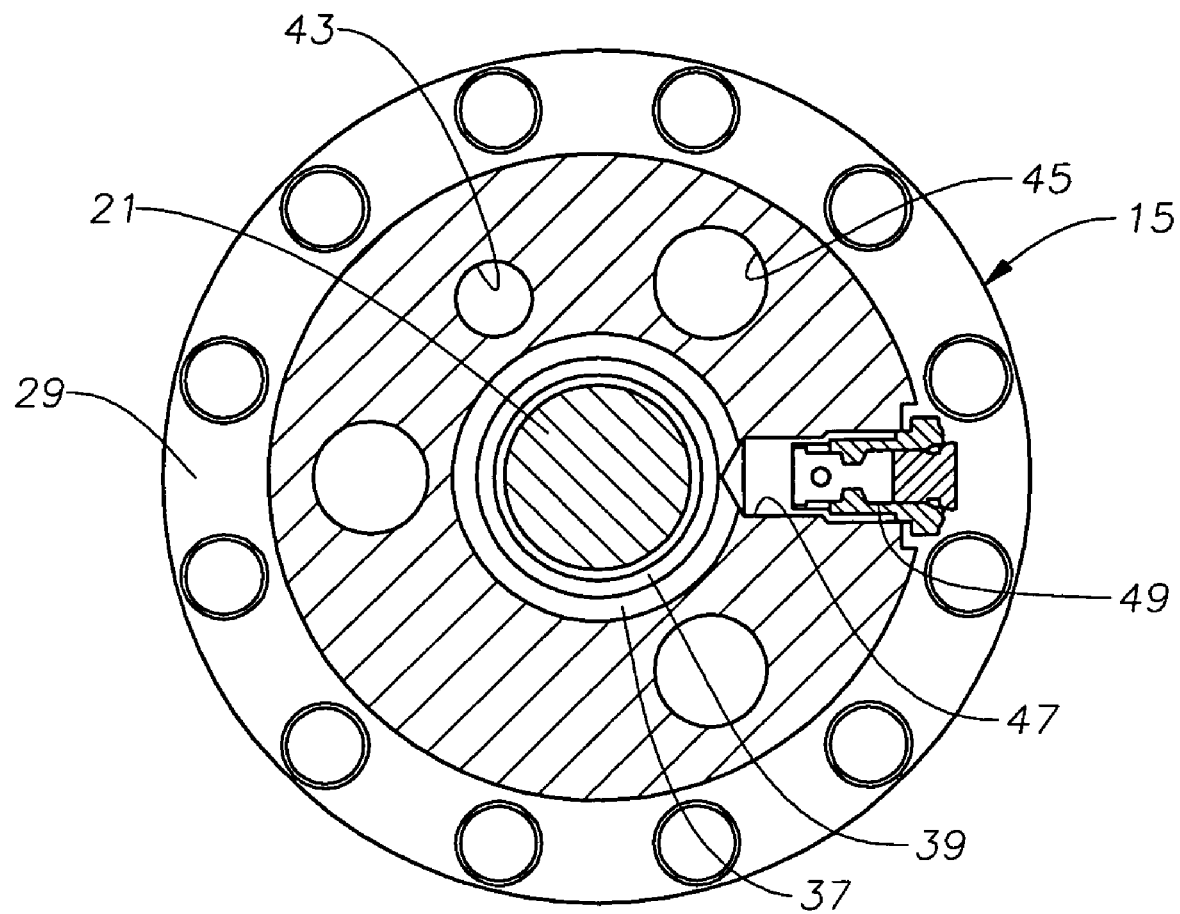
FIG. 3 is a transverse sectional view of the interconnecting assembly of FIG. 1, taken along the line 3-3 of FIG. 1.

Referring also to FIG. 3, a communication passage 43 extends from upper shoulder 33 to lower face 35 (FIG. 1). Communication passage 43 is a drilled hole in this embodiment that is offset from central cavity 37 and parallel to the axis of upper drive shaft 21. Base 15 also has three conductor passages 45 (FIG. 3), each containing one of the electrical conductors 25. The insulation on each conductor 25 forms a seal with conductor passage 45.

Referring again to FIG. 1, a vent port 47 extends from central cavity 37 to the exterior of base 15. Vent port 47 is located just below bushing 39, which defines the upper end of central cavity 37. A vent port plug 49, which may be of a variety of types, is used to close and open vent port 47. Vent port 47 does not intersect communication passage 43.

The interior of upper motor 11 is filled with lubricant and a means optionally may be provided to prevent lubricant from flowing out communication passage 43 after the shipping cap (not shown) of upper motor 11 is removed. In this embodiment, this means is provided by a check valve 51, but it could alternately comprise a rupturable disk. Check valve 51 has a valve element 53 that is movable within communication passage 43. When seated against a seat 55 at the lower end of communication passage 43, valve element 53 will block downward flow of oil. Valve element 53 has a valve stem 57 that extends downward. A coil spring 59 urges valve element 53 downward.

A lower motor 61 has a head 63 on its upper end with a flange 66 that connects to a flange 65 of base 15. The terms "upper" and "lower" are not used in a limiting manner because lower motor 61 could actually be an intermediate motor, with another motor secured below. Flange 65 is an annular member that extends radially outward from base 15, and flange 66 is an annular member that protrudes upward from an upper face 73 of head 63. Flanges 65 and 66 are connected to each other by conventional fasteners. Base 15 has an annular lip portion with seals that extends into the inner diameter of flange 66 in this embodiment.

A lower drive shaft 67 is rotatably carried within lower motor 61. Lower drive shaft 67 has an upper splined end that interconnects with splined end 41 by means of a coupling or sleeve 69. Drive sleeve 69 has internal splines and is preferably carried on lower drive shaft 67 and supported by coil spring 71. Different types of couplings may be employed, including ones that enable tension to be transferred from upper shaft 21 to lower shaft 67.

Upper face 73 of lower head 63 is spaced below lower face 35 of upper base 15 after make-up. Check valve stem 66 contacts upper face 73 when base 15 engages head 63. A communication passage 75 extends from upper end 73 downward through head 63. Communication passage 75 is located within a different sectional plane from communication passage 43 in this embodiment. Offsetting communication passages 43 and 75 enables stem 57 to contact a portion of upper face 73 of lower head 63 to open check valve 51.

Referring now to FIG. 2B, lower motor 61 has an upper port 77 that intersects lower communication passage 75 (FIG. 1) and extends from the exterior. A conventional plug 78 is employed to close port 77. In this embodiment, a thrust bearing 79 is located within an upper portion of lower motor 61 below head 63. Lower motor 61 has a base 81, shown in FIG. 2C. Lower motor base 81 could be a simple blind plug, but in this embodiment, it is used to connect to a sub (not shown) that contains instrumentation for measuring pressure and temperature. Lower motor base 81 may have a lower port 83.

In operation, the operator may initially fill upper motor 11 and lower motor 61 with oil in a conventional manner. Motors 11, 61 are preferably filled at the manufacturer's facility detached from each other, then shipped to the wellsite with caps on the upper and lower ends to retain the oil therein. Normally, the filling is performed on upper motor 11 by inclining it and drawing a vacuum through upper port 27. Then the operator pumps oil in from a port (not shown) at the lower end. The lower port could be located within the shipping cap (not shown) or it could be a port extending through upper motor base 15 to communication passage 43. Lower motor 61 is preferably vacuum filled in the same manner by drawing a vacuum through lower motor upper port 78 (FIG. 2B) and pumping oil through lower port 83 (FIG. 2C).

At the wellsite, the operator removes the shipping cap from lower motor 61 and suspends it vertically above the well, such as by a workover rig. The oil previously filled in lower motor 61 may extend completely to the upper edge of flange 66 of lower motor head 63.

The operator then opens upper port 27, picks up upper motor 11 with the rig and suspends it vertically above lower motor 61. Lower flange 65 will initially be spaced a short distance above upper motor head 63. The operator will open vent port 47 in upper motor 11. The operator removes the cap secured to upper motor base 15, which causes any oil in central cavity 37 to leak out. Check valve 51 will remain closed due to the force of spring 59 (FIG. 1), blocking any flow downward through communication passage 43.

The operator then lowers upper motor 11 downward until base 15 inserts into lower head 63 as shown in FIG. 1. The operator secures the fasteners to flanges 65 and 66. When base 15 inserts into the counterbore of lower head 63, check valve 57 opens, communicating the oil in the interior of upper motor 11 with lower motor 61. Some of the oil will initially flow downward through communication passage 43 and back upward into central cavity 37. The air trapped in central cavity 37 is displaced by the oil flowing into central cavity 37 and is dispelled out through open vent port 47. Once oil begins to flow out vent port 47, the operator replaces plug 49.

The operator may then top up the oil within upper motor 11 in a conventional manner. Preferably, this procedure is done by pumping oil into lower head port 77 (FIG. 2B) until oil begins to flow out upper motor upper port 27 (FIG. 2A). The operator lowers the connected motors 11,61 and places a plug in upper port 27.

The operator then will connect the seal section (not shown) to upper motor 11. This may be done conventionally, or the base (not shown) of the seal section may have a vent port similar to vent port 47 (FIG. 1). If so, the same procedure as described above could be followed. A pump (not shown) will be connected to the seal section in a conventional manner.

The invention has significant advantages. The inclusion of a vent port for the shaft central cavity in the base allows the trapped air therein to be easily displaced. This procedure may obviate vacuum filling of tandem motors at the wellsite after they are connected together. Avoiding vacuum filling of tandem motors at the wellsite saves rig time and avoids difficulties occurring in cold climates.

While the invention has been shown in only one of its forms, it should be apparent to those skilled in the art that it is not so limited but is susceptible to various changes without departing from the scope of the invention.

The invention claimed is:

1. A method of connecting tandem upper and lower subs of an electrical submersible pump assembly, the upper sub having a base that interconnects with a head of the lower sub, each of the subs having a drive shaft with a splined end that mates with the splined end of the other drive shaft, the base of the upper sub having a central cavity surrounding the splined end of the drive shaft of the upper sub, the method comprising:

(a) providing a vent port in the base of the upper sub extending from the central cavity to an exterior of the base of the upper sub;

(b) introducing a quantity of oil into each of the subs while the subs are apart from each other to substantially fill each of the subs; then (c) opening the vent port, and with a lower end of the central cavity open, lowering the upper sub downward into engagement with the lower sub, which causes oil in the upper sub to flow downward and into the central cavity, the open vent port allowing any air trapped in the central cavity to displace out through the vent port.

2. The method according to claim 1, further comprising after step (c): closing the vent port and topping up the oil in the upper sub to replace the oil that flowed downward from the upper sub during step (c).

3. The method according to claim 1, further comprising:
providing a communication passage through the base that is separated from the central cavity; and wherein
step (c) comprises flowing the oil downward through the communication passage into the head of the lower sub and back upward into the central cavity.

4. The method according to claim 3, wherein step (a) comprises isolating the vent port from the communication passage.

5. The method according to claim 3, further comprising placing a check valve in the communication passage to restrict downward flow of oil through the communication passage, the check valve automatically opening when the base of the upper sub engages the head of the lower sub.

6. The method according to claim 1, further comprising after step (c): closing the vent port and pumping oil up into the upper sub through a port separate from the vent port to replenish oil that flowed downward from the upper sub in step (c).

7. A method of connecting tandem upper and lower motors of an electrical submersible pump assembly, the upper motor having a base that interconnects with a head of the lower motor, each of the motors having a drive shaft, the drive shafts having mating splined ends, the base of the upper motor having a central cavity surrounding one of the splined ends of the drive shaft of the upper motor, the base of the upper motor having a communication passage separated from the central cavity, the method comprising:

(a) providing a vent port in the base of the upper motor extending from an exterior of the base of the upper motor to the central cavity;

(b) substantially filling the motors separately with oil; then (c) suspending the upper motor above the lower motor, with the central cavity facing downward and a lower end of the central cavity open, which causes any oil within the central cavity to flow out, thereby leaving an air pocket in the central cavity;

(d) opening the vent port and lowering the base of the upper motor onto the head of the lower motor, causing oil to flow down the communication passage from the upper motor and into the central cavity, and displacing air of the air pocket out the vent port; then (e) closing the vent port and introducing more oil into the upper motor to replace oil drained during steps (c) and (d).

8. The method according to claim 7, wherein step (a) comprises separating the vent port from the communication passage.

9. The method according to claim 7, wherein in step (d), the oil displacing the air pocket flows downward and out of the communication passage, then up into the central cavity from the open lower end of the central cavity.

10. A method of connecting tandem upper and lower motors of an electrical submersible pump assembly, the upper motor having a base that interconnects with a head of the lower motor, each of the motors having a drive shaft, the drive shafts having mating splined ends, the base of the upper motor having a central cavity surrounding one of the splined ends of the drive shaft of the upper motor, the base of the upper motor having a communication passage separated from the central cavity, the method comprising:

(a) providing a vent port in the base of the upper motor extending from an exterior of the base of the upper motor to the central cavity and separated from the communication passage;

(b) substantially filling the motors with oil while the motors are apart from each other; then (c) suspending the upper motor above the lower motor, with the central cavity facing downward and a lower end of the central cavity open, thereby resulting in an air pocket in the central cavity;

(d) opening the vent port and lowering the base of the upper motor onto the head of the lower motor, causing oil to flow down the communication passage from the upper motor and back up into the central cavity, the oil flowing back up into the central cavity displacing air from the air pocket out the vent port; then (e) closing the vent port and introducing more oil into the upper motor to replace oil that flowed from the upper sub during step (d).

* * * * *

UNITED STATES PATENT AND TRADEMARK OFFICE
CERTIFICATE OF CORRECTION

| | |
|---|---|
| PATENT NO. | : 7,611,338 B2 |
| APPLICATION NO. | : 11/387184 |
| DATED | : November 3, 2009 |
| INVENTOR(S) | : Mike Allen Swatek et al. |

It is certified that error appears in the above-identified patent and that said Letters Patent is hereby corrected as shown below:

Column 1, line 34, before "connected" insert --is--

Column 2, line 64, delete "an" after "has"

Signed and Sealed this

Seventh Day of September, 2010

David J. Kappos
*Director of the United States Patent and Trademark Office*